(12) United States Patent
Nordlander

(10) Patent No.: US 11,702,928 B2
(45) Date of Patent: *Jul. 18, 2023

(54) CASING IMAGING METHOD

(71) Applicant: WWT NORTH AMERICA HOLDINGS, INC., Houston, TX (US)

(72) Inventor: Rob Nordlander, Houston, TX (US)

(73) Assignee: WWT NORTH AMERICA HOLDINGS, INC., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/451,115

(22) Filed: Oct. 15, 2021

(65) Prior Publication Data

US 2022/0213784 A1  Jul. 7, 2022

Related U.S. Application Data

(63) Continuation of application No. 16/434,909, filed on Jun. 7, 2019, now Pat. No. 11,156,077.

(60) Provisional application No. 62/682,609, filed on Jun. 8, 2018.

(51) Int. Cl.
*E21B 43/10* (2006.01)
*E21B 47/06* (2012.01)
*E21B 47/085* (2012.01)

(52) U.S. Cl.
CPC ............ *E21B 47/085* (2020.05); *E21B 43/10* (2013.01); *E21B 47/06* (2013.01)

(58) Field of Classification Search
CPC ........ E21B 43/10; E21B 47/06; E21B 47/085; E21B 47/12; G01V 1/22; G01V 1/50; G01V 1/52; G01V 2001/526
See application file for complete search history.

(56) References Cited

U.S. PATENT DOCUMENTS

| | | |
|---|---|---|
| 4,484,628 A | 11/1984 | Lanmom |
| 4,597,440 A | 7/1986 | Pottier |
| 4,799,546 A * | 1/1989 | Hensley ............... E21B 17/003 |
| | | 175/50 |
| 4,844,161 A | 7/1989 | Rankin et al. |
| 5,589,825 A | 12/1996 | Pomerleau |
| 6,050,141 A | 4/2000 | Tello |
| 6,119,777 A | 9/2000 | Runia |
| 7,134,493 B2 | 11/2006 | Runia |
| 7,913,806 B2 | 3/2011 | Pabon et al. |
| 8,866,632 B2 | 10/2014 | Hrametz et al. |
| 11,156,077 B2 | 10/2021 | Nordlander |
| 2009/0173538 A1 | 7/2009 | Estes et al. |

(Continued)

FOREIGN PATENT DOCUMENTS

| | | |
|---|---|---|
| GB | 2002902 | 5/1982 |
| GB | 2 520 969 | 6/2015 |
| WO | WO 2021/034780 A1 | 2/2021 |

OTHER PUBLICATIONS

International Search Report for PCT Application No. PCT/US2020/046709, dated Dec. 3, 2021.

(Continued)

*Primary Examiner* — Daniel P Stephenson
(74) *Attorney, Agent, or Firm* — Knobbe, Martens, Olson & Bear, LLP

(57) ABSTRACT

A method of imaging a wellbore casing using an ultrasonic sensing system through the material of a drill string as the drill string is tripped out of the wellbore.

7 Claims, 3 Drawing Sheets

(56) References Cited

U.S. PATENT DOCUMENTS

| | | |
|---|---|---|
| 2012/0080184 A1 | 4/2012 | Jahangir et al. |
| 2016/0017678 A1 | 1/2016 | Hrametz et al. |
| 2016/0237759 A1 | 8/2016 | Li-Leger et al. |
| 2017/0275987 A1 | 9/2017 | Al-Hussain et al. |
| 2017/0350242 A1 | 12/2017 | Nguyen |
| 2021/0054728 A1 | 2/2021 | Fellinghaug et al. |

OTHER PUBLICATIONS

International Written Opinion, re PCT/US2020/046709, dated Jul. 12, 2021.

* cited by examiner

CASING IMAGING METHOD

CROSS REFERENCE

This application is a continuation of U.S. patent application Ser. No. 16/434,909 filed Jun. 7, 2019, which claims the benefit of U.S. Patent Application No. 62/682,609 filed Jun. 8, 2018, the entireties of which are hereby incorporated by reference.

BACKGROUND

Field

This disclosure generally relates to systems and methods for measuring a thickness of a casing in a wellbore.

Related Art

The present method and device can replace expensive and cumbersome wireline logging techniques. In a wireline logging, the drill string removed and a logging device is lowered into a wellbore attached by a coiled tube assembly. The logging device is lowered to the bottom of the well or below the area to be logged and the wellbore is logged as the logging device is retrieved out of the wellbore by the attached wireline cabling. The coiled tube assembly can include connecting lines for powering the logging device and transmitting data up to the surface during the logging operations.

SUMMARY

According to one aspect of the present disclosure, an untethered logging device can be used in the alternative to or in addition to traditional wireline logging techniques. The logging device can be deployed within the drill string in a wellbore (e.g., without removal of the drill string). The logging device can be inserted directly into the interior of the drill string. As compared to wireline logging, the untethered logging device offers the time and effort saving advantages not having to first remove the entire drill string from the wellbore.

According to another aspect of the present disclosure, the untethered logging device can include an ultrasonic sensor system. The ultrasonic waves can be passed through the material of the drill string 30. This approach has advantages over the apparatus and method suggested in U.S. Pat. No. 5,589,835. In U.S. Pat. No. 5,589,835, the logging device requires a hydraulically actuated window in the drill string/catcher sub assembly to provide access to the wellbore for the logging tool sensors. By passing the ultrasonic waves through the material of the drill string, the logging device remains protected within the drill string. Moreover, the operation of the sensor system is not predicated upon precise alignment with windows or apertures through the drill string to the annulus or the operation of the hydraulically actuated windows.

According to another aspect of the present disclosure, a method of in situ determination of a thickness of a casing along a wellbore includes inserting a untethered, dart, such as a dart-shaped logging device into an interior of a drill string at an upper end of the wellbore. The drill string is at least partially disposed within the wellbore and includes a plurality of connected pipe segments. A flow of drilling fluid is pumped through the interior of the drill string to carry the logging device to a bottom hole assembly of the drill string. The bottom hole assembly is within the wellbore. The logging device is secured within the drill string with a catcher sub. The catcher sub is located in the bottom hole assembly. Using a pressure sensor, an increase in a fluid pressure of the drilling fluid within the interior of the drill string above the logging device is detected. This indicates arrival of the logging device at the catcher sub.

The logging device is remotely activating to initiate an ultrasonic sensor system. The drill string is tripped from the wellbore with the logging device within the catcher sub. The logging device records logging data through the drill string using the ultrasonic sensor system as the drill string is retrieved from the wellbore with the logging device. The logging data is stored on a memory of the logging device. The logging device is retrieved from the drill string at the upper end of the wellbore. The logging date is downloaded from the logging device. The logging data is processed to determine the thickness of the casing along the wellbore.

According to another aspect of the present disclosure, the logging device is secured within the catcher sub and allows the flow of drilling fluid to pass continuously from above the catcher sub to below the catcher sub within the drill string.

According to another aspect of the present disclosure, the any portion of the casing indicated to have high wear is remediated.

According to another aspect of the present disclosure, the remediation includes installation of a non-rotating casing protector installed within the well bore.

According to another aspect of the present disclosure, the sensor system of the logging device includes an inertial sensor to track vertical movement of the logging device in the well bore.

According to another aspect of the present disclosure, processing the logging data to determine the thickness of the casing includes determining an inner diameter of the casing and an outer diameter of the casing for each vertical interval.

According to another aspect of the present disclosure, remotely activating the logging device requires using one or more pulses through the drilling fluid.

According to another aspect of the present disclosure, the logging device takes measurements of the wellbore in 360 degrees around the drill string.

According to another aspect of the present disclosure, the ultrasonic sensor system is battery powered.

According to another aspect of the present disclosure, the ultrasonic sensor system operates to record the logging data through an outer thickness of the drill string.

According to another aspect of the present disclosure, the drill string and the catcher sub do not include apertures through which the ultrasonic sensor system operates to record the logging data.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION OF THE DRAWINGS

Various examples are depicted in the accompanying drawings for illustrative purposes, and should in no way be interpreted as limiting the scope of the examples. Various features of different disclosed examples can be combined to form additional examples, which are part of this disclosure.

DETAILED DESCRIPTION

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Drilling Operations

Figure 1:
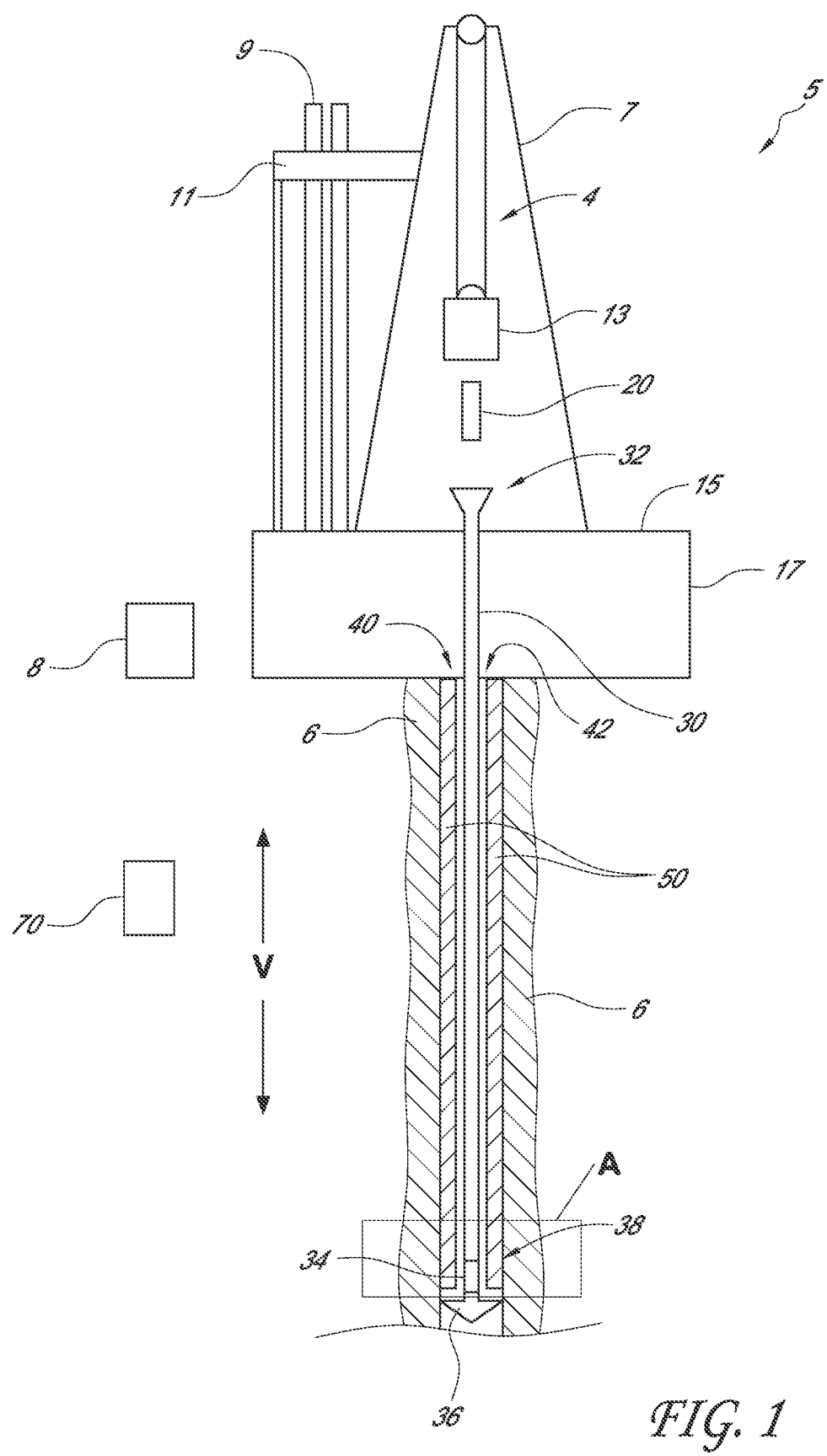
FIG. 1 shows a schematic representation of a drilling rig including an untethered logging device.

FIG. 1 shows a drilling rig 5. The drilling rig 5 can be used either on or offshore to drill a wellbore 40 in a substrate 6. The substrate 6 can comprise layers of earth, sediment, rock, and/or other materials. The wellbore 40 can be used to extract oil and gas from the substrate 6.

The drilling rig 5 can include a drilling platform 17. The drilling platform 17 can include a floor 15. The drilling platform 17 can support a derrick 7. The derrick 7 can include a pulley system 4. The derrick 7 and pulley system 4 can be used to assemble a drill string 30. The drill string 30 can be made of a plurality of drill pipe segments 9. The drill pipes 9 can be stored in a rack 11 adjacent to the derrick 7. The drill pipe segments 9 can be connected together (e.g., screwed or clamped end-to-end) to form the drill string 30. The derrick 7 and pulley system 4 can be used to connect each of the drill pipe segments 9 to form the drill string 30. A mechanism on the drill floor 15 can rotate the drill string 30 (e.g., for drilling purposes).

The drill string 30 can include an upper end 32. The drill string 30 can include a lower end 36. The lower end 36 can include a drill bit for digging the wellbore 40. The drill bit and the lower end 36 can be a part of a bottom hole assembly 38 of the drill string 30. The drill string 30 can include an outer thickness of material in a generally cylindrical shape with an interior space therein. The interior space can be a hollow portion within the drill pipe segments 9.

A drilling circulation head 13 can attach with the drill string 30. The drilling circulation head 13 can circulate a pumped drilling fluid (e.g. a drilling mud) through the drill string 30 and into the wellbore 40. The drilling fluid can enter at the upper end 32, circulate through the interior of the drill string 30 and out the lower end 36 and into the wellbore 40.

The wellbore 40 can include an annulus 42. The annulus 42 can be between an outer surface of the drill string 30 and the substrate 6. The annulus 42 can be located between the outer surface of the drill string 30 and a casing 50. The casing 50 can line the interior walls of a segment or an entirety of the wellbore 40. The casing 50 can attach with the substrate 6. The casing 50 functions to seal off the wellbore 40 from the substrate 6. The casing 50 can be used to control the flow of oil and gas out the wellbore 40. The casing 50 can be used to prevent contamination of the substrate 6 (e.g., a water table therein).

The casing 50 can be formed of a cement material, composite, or other material. The geometry of the casing 50 (e.g. inner diameter, outer diameter, thickness, presence of voids, etc.) and/or the attachment of the casing 50 with the substrate 60 can be important for the overall safety and reliability of the wellbore 40. The casing 50 can include multiple layers of casing material. The casing 50 can be used with a steel tubing or other metallic materials lining the wellbore 40.

Under normal operations of the drilling rig 5, the drill string 30 is inserted pipe segment 9 by pipe segment 9 using the derrick 7 and pulley system 4. The weight of drill string 30 on the drill head and rotation thereof forms the wellbore 40. The drilling fluid is pumped into the drill string 30 at the circulation head 13. The drilling fluid can flow through the interior of the drill string 30 from the upper end 32 to the lower end 36. The drilling fluid can then flow out into the annulus 42 and carry cuttings and other debris up out of the wellbore 40. The drilling fluid can then be collected, cleaned and recirculated (e.g., pumped) through the drilling circulation head 13.

Logging Device and Catcher Sub

At certain times (e.g., after installation of the casing 50), it is necessary to determine the integrity of the casing 50 (e.g., geometry such as inner diameter, outer diameter, voids, connection with the substrate 6) or other properties of the wellbore 40 (e.g., geometry). A logging device 20 can be used to measure the wellbore 40. The logging device 20 can be used to measure material properties and/or geometry of the substrate 6 and/or the casing 50.

In a typical wireline logging operation for evaluating a casing, the drill string 30 is removed from the wellbore 40 using the derrick 7 and the pulley system. The drill string 30 is lifted and each of the drill pipe segments 9 making up the drill string 30 can removed (e.g., stored in the rack 11). A tethered logging device can then be aligned and inserted into the wellbore 40. Typically the tethered logging device will be lowered to the bottom of the wellbore 40 and logging operations will be conducted as it is retrieved on the attached coiled tubing up to the surface. The data retrieved by the tethered logging device can be transmitted as the logging device is retrieved from the wellbore 40. The tethered logging device can also be powered from the surface through the coiled tubing assembly.

An untethered logging device 20. such as a dart can be used in the alternative to or in addition to traditional wireline logging techniques. The logging device 20 can be deployed with the drill string 30 in the wellbore 40. The logging device 20 can be inserted directly into the interior of the drill string 30 or the annulus 42. As compared to wireline logging, the untethered logging device 20 offers the time and effort saving advantages not having to first remove the entire drill string 30 from the wellbore 40.

The logging device 20 can lower to the bottom hole assembly 38. The logging device 20 can be dart-shaped to help maintain the orientation of the logging device within the wellbore 40. Dart-shaped can mean a generally tapered profile. Dart-shaped can also optionally include a tail section that can orient a nose section vertically downwards. The logging device 20 can either move under the force of gravity and/or can be pumped by continued circulation of the drilling fluid through the drill string 30. The logging device 20 can be captured or secured inside the bottom hole assembly 38 at the desired location by a catcher, such as a catcher sub 34. The catcher sub 34 can be located in the bottom hole assembly 38 of the drill string 30. The catcher sub 34 can secure the location of the logging device 20 within the drill string 30.

Figure 2:
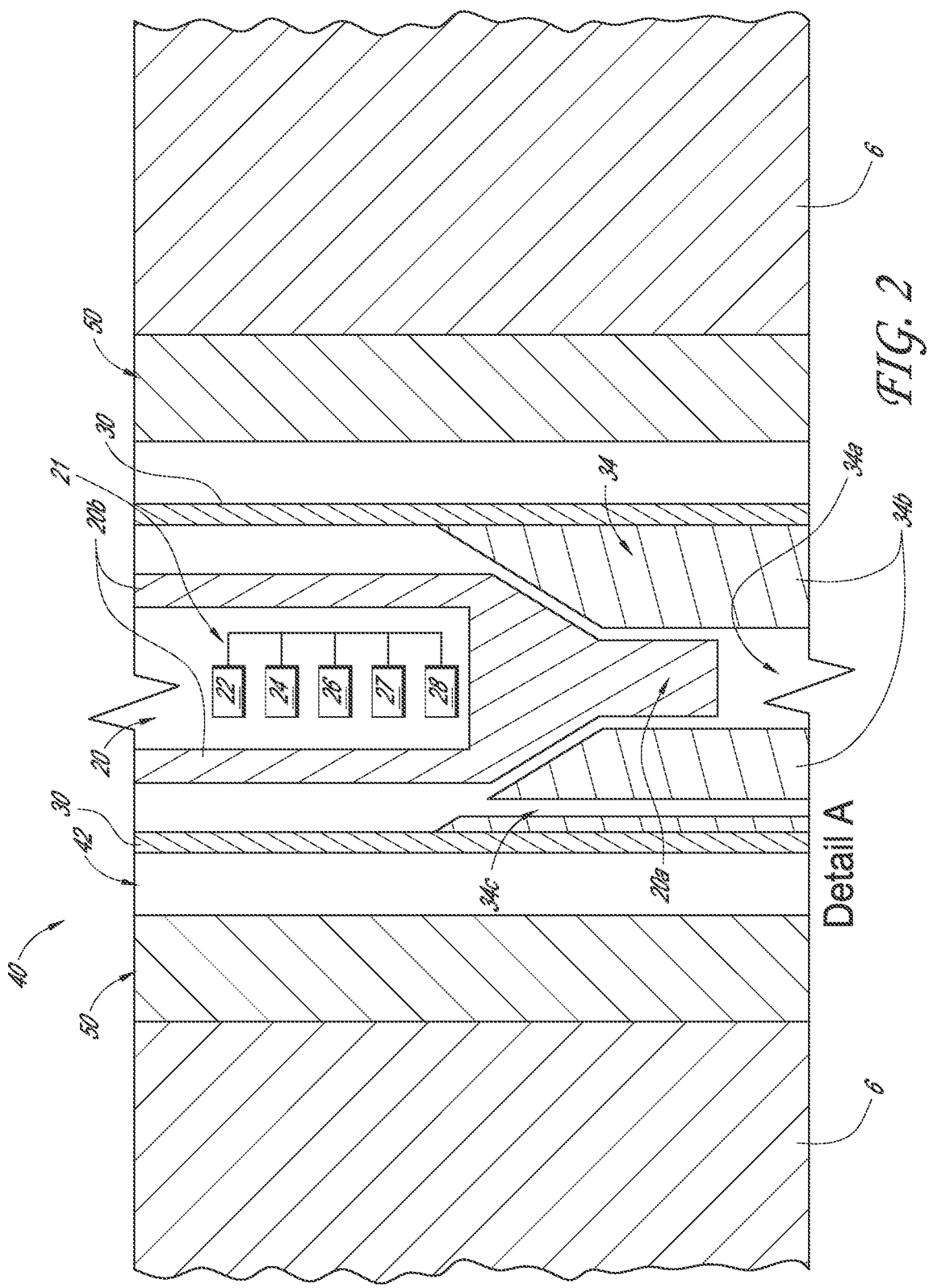
FIG. 2 is a detailed view taken at detail A of FIG. 1.

As shown in further detail in FIG. 2, the catcher sub 34 can include a central passage 34a. The central passage 34a can be surrounded by a circumferential region 34b of the catcher sub 34. The logging device 20 can be at least partially received within the central passage 34a and/or the circumferential region 34b. The logging device 20 can contact the central passage 34a and/or the circumferential region 34b. The logging device 20 can include a protuberance 20a. The protuberance 20a can be at least partially received within the central passage 34a. The protuberance 20a and central passage 34a can orient and/or center the logging device 20 within the drill string 30.

As the logging device 20 descends the drill pipe 30 to the catcher sub 34, the drilling fluid can continue to be pumped through the interior of the drill string 30. Accordingly, the pressure of the drilling fluid within the drill string can be generally steady. Moreover, drilling rig operations can be performed as normal. When the logging device 20 contacts and/or is secured with the catcher sub 34, the pressure of the drilling fluid in the drill string 30 can spike. The spike in the pressure of the drilling fluid in the drill string 30 can indicate that the logging device 20 is in position within the catcher sub 34. However, this can interrupt or hamper normal drilling operations (e.g., restricting the flow of drilling fluid back to the surface).

The flow of drilling fluid past the catcher sub 34 with the logging device therein can advantageously allow continued drilling operations. Accordingly, the catcher sub 34 can include one or more pathways 34c extending through (e.g., from above to below) the catcher sub 34. The one or more pathways 34c can extend through at least a portion of the circumferential region 34b of the catcher sub 34. The drilling fluid can flow through the pathways 34c and not be completely stopped by the logging device 20. Normal drilling operations can continue after arrival of the logging device at the catcher 34. In some implementations, the drilling fluid can be routed into the annulus 42 above the catcher 34.

The logging device 20 can include an onboard control system 21. The onboard control system 21 can include a battery 22. The battery 22 can provide power to other onboard control system components. The onboard control system 21 can include a memory 24. The memory 24 can receive and record logging data of the wellbore 40. The logging data can correspond to data received from a sensor system 26. The onboard control system 21 can include an inertial sensing system 27. The inertial sensing system 27 can detect movement of the logging device 20 vertically within the wellbore 30.

The onboard control system 21 can include a controller 28. The controller 28 can execute stored instructions (e.g., stored on the memory 24) for operating the sensor system 26, operating the inertial sensing system 27, recording logging data and/or inertial sensing data on the memory 24, and/or managing power from the battery 22.

The sensor system 26 can include at least one ultrasonic transducer for emitting ultrasonic electromagnetic radiation. In one embodiment the sensor system 26 comprises a plurality of ultrasonic transducers. The at least one ultrasonic transducer can be oriented radially outwardly from the logging device 20. The ultrasonic waves emitted and/or incident return waves can pass through an outer portion 20b of the logging device 20 and/or the material of the drill string 30. In one implementation, the sensor system 26 can take measurements in 360 degrees around the logging device 20. The at least one ultrasonic transducer can be rotatable within the logging device 20.

The sensor system 26 can include at least one sensor for detecting ultrasonic electromagnetic radiation (e.g., directly or indirectly from the at least one ultrasonic transducers). The ultrasonic transducers can direct ultrasonic waves towards one or more interfaces between pairs of materials with different masses, densities or other properties in the wellbore 40. This can include the drill string 30, the casing 50 and/or the substrate 6. The ultrasonic transducers can emit ultrasonic waves. The at least one sensor can pick out perfections or echoes of at least a portion of the emitted ultrasonic waves returning from the interfaces. This data can be used to provide useful information regarding dimensions of these interfaces and other properties.

However, besides the interfaces of interest (e.g. casing 50) the incidences of ultrasonic waves may also encounter multiple other echoes. This can result in multiple echoes that are unwanted contributions to the detected signals that can obscure the reflected signals of interest. Various mathematical techniques can be used to process the detected signals to reduce (e.g. subtract, minimize or filter) the unwanted contributions from the reflected signals of interest. The reflected signals of interest can indicate only the interfaces of interest.

Various mathematical techniques can otherwise extract desired information from the detected signals. For example, US2016/0162614 (the entirety of which is incorporated by reference) discloses an array of simulated response waveforms that correspond to a set of candidate acoustic impedances and iteratively calculates a best fit simulated response waveform to the measured ultrasonic response waveform. This can be used to analyze the recorded data from the sensors picking up the ultrasonic incident waves to later derive geometries and other properties of the wellbore 40. As another example, US2015/0177405 (the entirety of which is incorporated by reference) discloses reducing coherent noise and measured wellbore log data by identifying common patterns among the individual measurements and subtracting these common patterns from the wellbore log data. As another example, US2016/0231446 (the entirety of which is hereby incorporated by reference) discloses determining a thickness of a wellbore casing by comparing a measured waveform with a modelled waveform.

Logging Method

Figure 3:
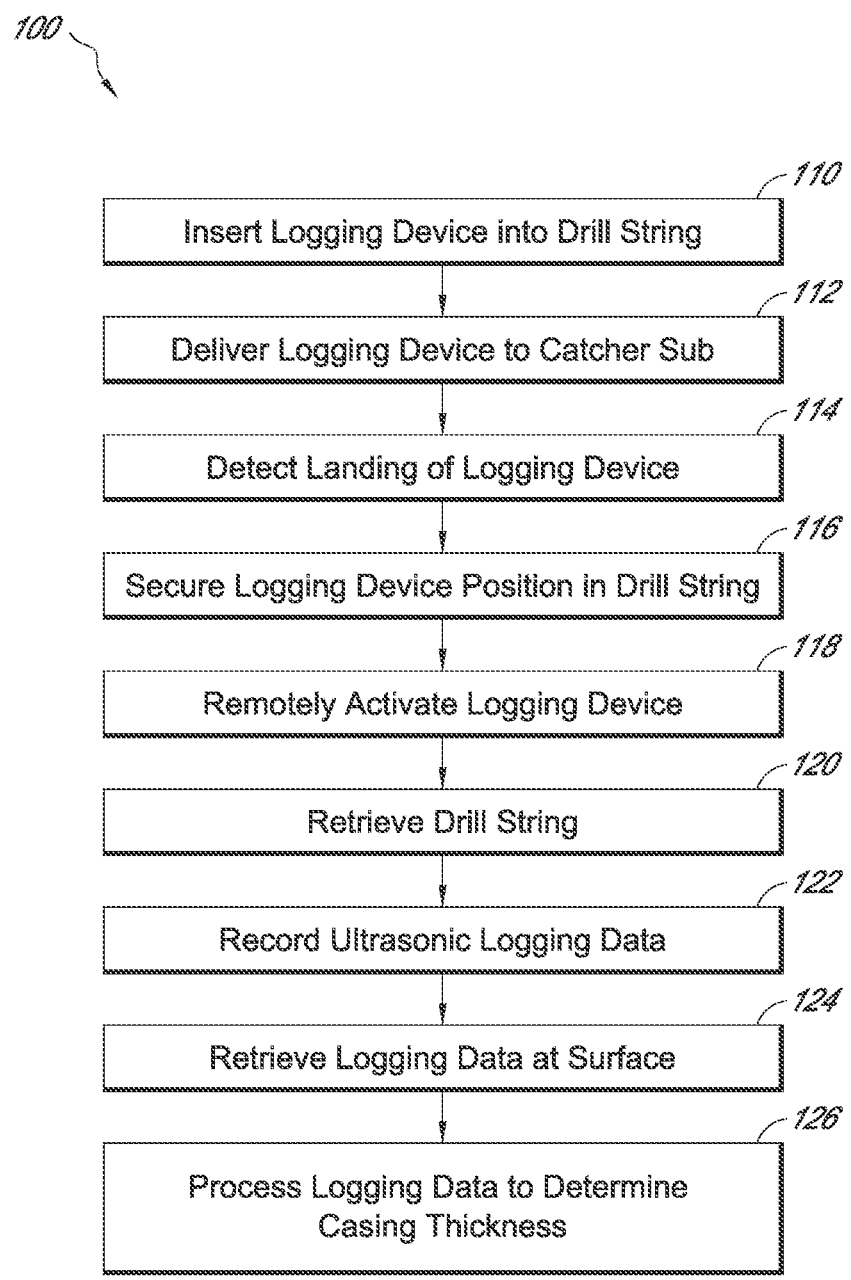
FIG. 3 is a flowchart showing a method of measuring a thickness of a casing of a wellbore.

FIG. 3 illustrates a method 100 of logging the wellbore 40 to determine the integrity of the casing 50 using the untethered logging device 20. The method 100 can include any or all of the following steps for using the logging device 20 to log the wellbore 40. At step 110, the logging device 20 can be inserted into the drill string 30. The logging device 20 can be inserted into the interior space of the drill string 30 at the upper end 32. For example, the logging device 20 is inserted into the drill string 30 at the drilling floor 15.

At step 112, the logging device 20 can be delivered to the catcher sub 34. The logging device 20 can be either pumped or allowed to move under the force of gravity through the drilling fluid or other fluid (or empty drill string 30) contained within the drill string 30. As the logging device 20 descends to the catcher sub 34 normal drilling operations can be continued for the drilling rig 5.

At step 114 the drilling rig 5 (e.g. a monitoring system thereof) can detect the pressure increase in the drilling fluid within the drill string 30. The pressure increase can be above the catcher sub 34 and below the upper end 32 of the drill string. This can indicate that the logging device 20 has arrived at the catcher sub 34.

At step 116 the logging device 20 can be secured relative to the catcher sub 34. This can occur naturally under the pressure of the drilling fluid within the drill string 30 above the catcher sub 34. For example, the circumferential region 34b of the catcher sub 34 can direct the protuberance 20a into the central passageway 34a of the catcher sub 34. The catcher sub 34 can secure the relative position of the logging device 20 within the drill string 30. The catcher sub 34 can generally orient the sensor system 26 horizontally to emit waves and record data in an outwardly radial direction.

At step 118 the logging device 20 can be remotely activated. The logging device 20 can include a pressure sensing sensor (not shown). The pressure sensor can detect a pressure pulse sent through the drilling fluid from the drilling rig 5. The pressure pulse can initiate the logging device 20 from an inactive state to an active state. The active state can correspond to the sensor system 26 being turned on and the memory 24 recording logging data of the wellbore 40. Other remote activation mechanisms (e.g. radio frequency-based, mechanical activation or other) procedures are also fully contemplated herein.

At step 120 the drill string 30 is tripped out of the wellbore 40. This can occur by using the derrick 7 and pulley system 4 to remove the pipe segments 9 of the drill string 30. As the drill string 30 is tripped out of the wellbore 40, the logging device 20 can move upwards (e.g., continuously or at intervals) in a vertical direction out of the wellbore 40. The inertial sensor system 27 can track the vertical location or movement of the logging device 20. The vertical position of the logging device 20 can be correlated with the logging data from sensor system 26.

At step 122 the logging device 20 records ultrasonic logging data using the sensor system 26. The logging device 20 can record ultrasonic logging data as the drill string 30 is tripped out for at least a portion of the wellbore 40. The ultrasonic transducers can emit ultrasonic waves through the drill string 30 and the sensor can pick up incident waveforms through the drill string 30. The logging device 20 can record the data from the sensor system 26 on the memory 24.

In some implementations one or more filters can be applied to the data before it is stored on the memory 24. However, advantageously the controller 28 will store raw data from the sensors picking up the incident ultrasonic waves. The logging data can then be stored in a more complete format on the memory 24. This can be advantageous because of the power requirements for processing waveform data. Given the limitations on the battery 22, the processor 28 and/or the time spent in the borehole 40 it can be much more effective to process the logging data after, rather than during, the logging operation itself.

Passing the ultrasonic waves through the material of the drill string 30 has advantages over the apparatus and method suggested in U.S. Pat. No. 5,589,835. In U.S. Pat. No. 5,589,835, the logging device requires a hydraulically actuated windows in the drill string/catcher sub assembly to provide access for the logging tool sensors to the wellbore. This approach the disadvantages of being more prone to failure and more mechanically complicated. By passing the ultrasonic waves through the material of the drill string 30, the logging device 20 remains protected within the drill string 30. Moreover, the operation of the sensor system 26 is not predicated upon precise alignment with windows or apertures through the drill string 30 into the annulus 42.

At step 124 the logging device 20 arrives at the surface of the drill platform 17. At this point, the logging device 20 can be removed from the catcher sub 34. The memory 24 can either be physically removed or connected (e.g. wirelessly or wired) with a computer processing station 8. The drilling rig 5 can include a processing station 8. The processing station 8 can be either on site or off the drilling site. The processing station 8 can be a laptop or other type of computer.

At step 126 the data recorded on the memory 24 can be processed by the processing station 8. The vertical location data from the inertial system 27 can be correlated with the ultrasonic waveform data from the sensor system 26. The ultrasonic waveform data can be processed to evaluate the integrity of the wellbore 40. The ultrasonic waveform data can be used to identify the locations of interfaces between the different components of the wellbore 40 using any of the various mathematical techniques described or incorporated herein. This can include the inner diameter and the outer diameter of the casing 50, the diameter of the wellbore 40 and mechanical or physical properties of the substrate 6 and/or the integrity of the connection between the casing 50 of the substrate 6.

In some implementations the method 100 can further include remediation. For example, if areas of high wear within the casing 50 are detected, a remediation procedure can be implemented. The remediation can include the installation of a non-rotating casing protectors 70 at the locations indicating high wear. In some implementations, the integrity of the casing 50 can be discovered to be less than ideal (e.g. connection with the substrate 6 and/or thickness). Remediation procedures can include removal and/or reinstallation or repair of the casing 50.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

SUMMARY

Several illustrative examples of logging apparatus, systems, and methods have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of logging devices, systems and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims.

What is claimed is:

1. A method of in situ determination of a thickness of a casing along a wellbore comprising,
    propelling an untethered logging device within a drill string located at least partly within the wellbore;
    securing the logging device within a catcher within the drill string;
    activating the logging device to initiate an ultrasonic sensor system so that direct or indirect reflections of a first series of signals are detected by the ultrasonic sensor system;
    retrieving the drill string from the wellbore with the logging device within the catcher;
    recording logging data of the casing through the drill string using the ultrasonic sensor system; and
    processing the logging data to determine the thickness of the casing along the wellbore.

2. The method of claim 1, further comprising remediating any portion of the casing indicated to have high wear.

3. The method of claim 1, wherein the logging device takes measurements of the wellbore in 360 degrees around the drill string.

4. The method of claim 1, wherein the ultrasonic sensor system is battery powered.

5. The method of claim 1, wherein the ultrasonic sensor system operates to record the logging data through an outer thickness of the drill string.

6. The method of claim 1, wherein the drill string and the catcher radiate the first series of ultrasonic signals through the drill string, but not through apertures in the drill string.

7. The method of claim 1, wherein the logging device secured within the catcher is configured to allow the flow of drilling fluid to pass continuously from above the catcher to below the catcher within the drill string.

* * * * *